Feb. 2, 1960
D. C. SCHLUDERBERG
2,923,377
LIQUID VAPOR SEPARATING VESSEL
Filed Sept. 22, 1955
4 Sheets-Sheet 1
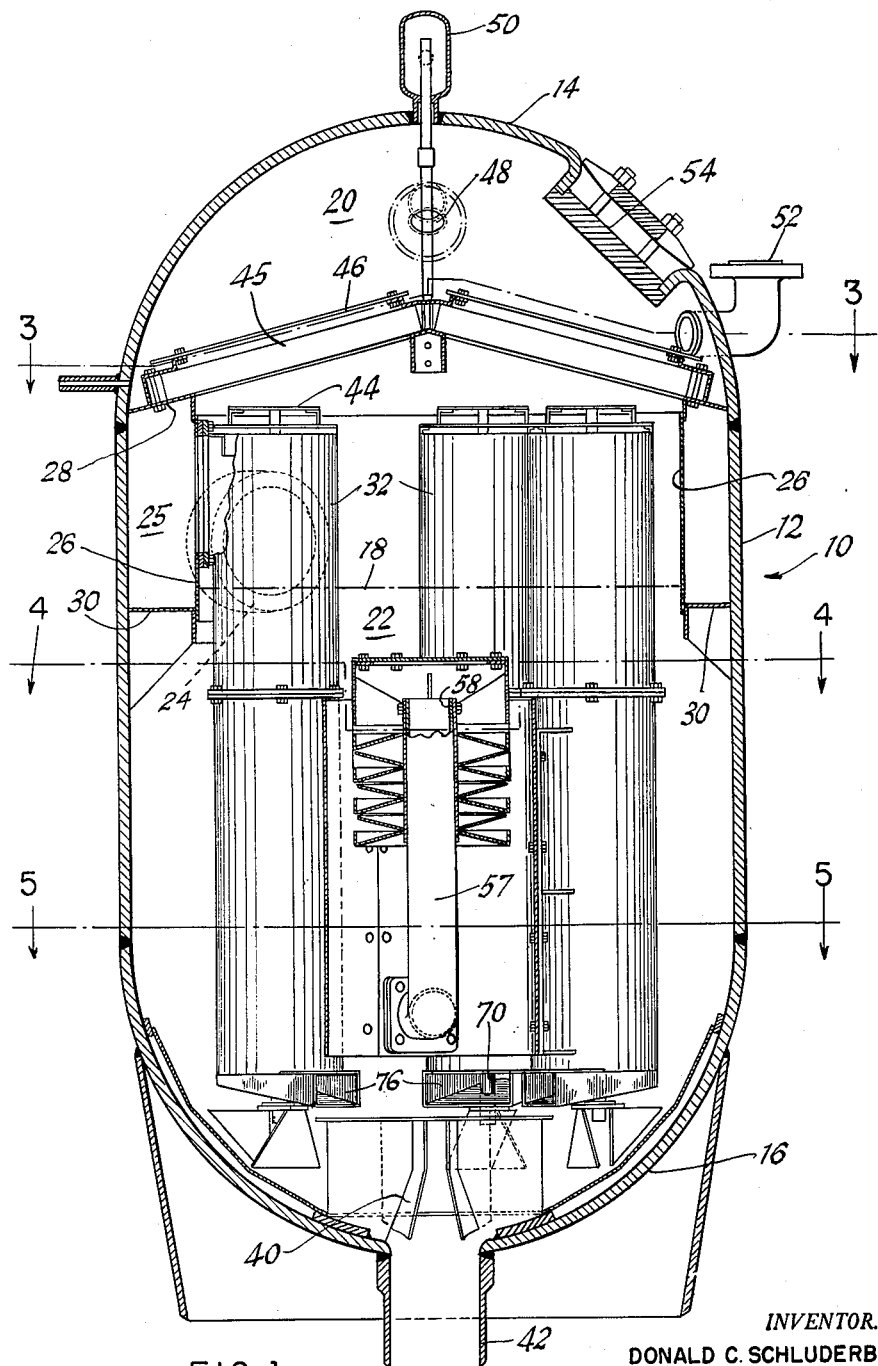
FIG.1
INVENTOR.
DONALD C. SCHLUDERBERG
BY 
ATTORNEY Feb. 2, 1960 D. C. SCHLUDERBERG 2,923,377
LIQUID VAPOR SEPARATING VESSEL
Filed Sept. 22, 1955 4 Sheets-Sheet 2

INVENTOR.
DONALD C. SCHLUDERBERG
BY
ATTORNEY

INVENTOR.
DONALD C. SCHLUDERBERG
BY
ATTORNEY

Feb. 2, 1960   D. C. SCHLUDERBERG   2,923,377
LIQUID VAPOR SEPARATING VESSEL

Filed Sept. 22, 1955   4 Sheets-Sheet 4

INVENTOR.
DONALD C. SCHLUDERBERG
BY
ATTORNEY

United States Patent Office 2,923,377
Patented Feb. 2, 1960

2,923,377

LIQUID VAPOR SEPARATING VESSEL

Donald C. Schluderberg, Oak Ridge, Tenn., assignor to The Babcock & Wilcox Company, New York, N.Y., a corporation of New Jersey Application September 22, 1955, Serial No. 535,933

5 Claims. (Cl. 183—85)

The present invention relates in general to an improvement in a vapor-liquid separating vessel, and more specifically it relates to an improved arrangement of cyclone type separators within the vessel.

In many modern day vapor generating units, it is essential that the vapor-liquid separating drum be disposed at a remote position relative to the heat exchanger portion of the vapor generator. It is a characteristic of this type vapor generator that the ratio of liquid circulated to vapor generated is low, and, in many cases, of the order of 1 to 4. It is a further characteristic of this type generator that it is subject to rapid change of vapor demand requirements. Such rapid demand changes result in rapid generation of vapor in the heat exchange portion, causing wide variations in liquid level within the separating vessel.

One of the greatest problems in vapor generators of this type arises when the unit is operating at its minimum load. At this time the ratio of liquid to vapor in the system is greatest and, upon a rapid increase to a high load, there occurs a very rapid increase in liquid level. The level increase is due to the sudden change in vapor production rate and it causes the heat exchanger to become filled with vapor, thus forcing liquid up into the drum and increasing the liquid level therein. Under this condition, the liquid level must rise very high in the separating vessel and special provisions must be made to take this large rise without impairing the separation capacity of the unit.

Many of the prior art vapor generating units have utilized horizontally elongated cylindrical drums in which there has been arranged a number of upright hollow cylindrical cyclone separators. Drums of this type have a very large water volume compared to the volume in the associated heat exchanger and, as such, are not subject to wide variations in liquid level, so that separators having a relatively short vertical dimension are adequate to cover the liquid level variation within the unit. However, many of the modern day applications of vapor generators require that the drum be of a very small volume compared to the volume contained in the associated heat exchanger. This small volume requires that rapid and widely varying liquid levels be properly handled without reducing the separating effectiveness of the vessel.

The present invention is directed to a vertically elongated pressure vessel having a normal liquid level in the upper half separating an upper vapor space and a lower liquid space and subject to substantial variations in elevation during operation. Within the vessel there is a ring of upright cyclone type separators arranged to receive and separate a vapor-liquid mixture and with a major portion of each separator being disposed below the normal liquid level. In each separator there is a baffle forming an annular shaped liquid passage which divides each separator into an upper whirl chamber for centrifugal separation of vapor and a lower down flow portion of substantial height which receives separated liquid. Within the annular shaped passage there is a series of impeller vanes arranged to convert the angular velocity of the separated liquid to a downward velocity in the lower downward flow portion.

The various features of novelty which characterize the invention are pointed out with particularity in the claims annexed to and forming a part of this specification. For a better understanding of the invention, its operating advantages and specific objects attained by its use, reference should be had to the accompanying drawing and descriptive matter in which is illustrated and described a preferred embodiment of the invention.

In the drawings:

Fig. 1 is a vertical section of a vapor-liquid vessel embodying the present invention;

Figure 2:
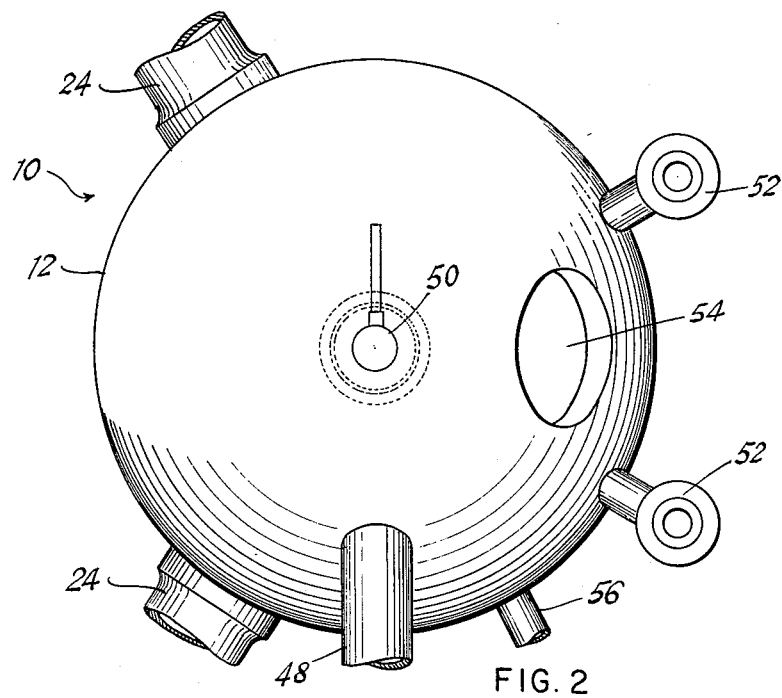
Fig. 2 is a top view of the vessel of Fig. 1.
Figure 3:
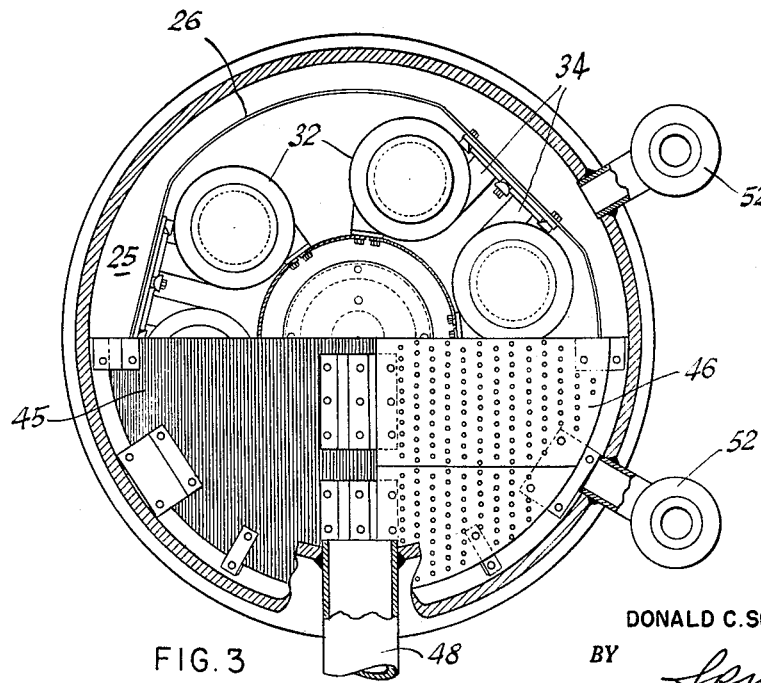
Fig. 3 is a composite plan section taken on the line 3—3 of Fig. 1; with half of the scrubbing apparatus removed.

Fig. 1 shows a vertically elongated vapor-liquid drum 10 having a straight cylindrical section 12 and upper head 14 and a lower hemispherical head 16 defining a volume in which there is a normal liquid level 18 separating the upper vapor space 20 from the lower liquid space 22. The vessel is arranged to be fed a vapor-liquid mixture through the inlet nozzles 24 with the vapor-liquid entering the inlet chamber 25 within the drum. This chamber is defined by an annular diaphragm baffle or inner wall 26 spaced from the cylindrical wall of the drum 10 as shown, the wall 26 having a plurality of spaced liquid-vapor outlets. It is further defined by a portion of the drum wall and by the top and bottom baffles 28 and 30. A plurality of cyclone type vapor-liquid separators 32 are disposed in a circle about the circumference of the drum and arranged to have their tangential inlets 34 receive the vapor-liquid mixture from the inlet chamber 25. Each of the separators causes the vapor-liquid mixture to whirl at a high velocity, thus allowing centrifugal force to separate the light vapor from the heavier liquid. The liquid passes out of the separator into the liquid space 22 of the vessel, there it mixes with the saturated liquid in the drum with the mixture passing through a vortex eliminator 40 and into the downcomer 42.

The separated vapor passes upwardly out of the top of each cyclone or whirl chamber 32 through a pressure distributor 44 into the vapor space 20 during which travel the vapor is scrubbed in multiple plate type scrubber elements 45 and is further scrubbed by passing through the perforated plates 46 on its way to the vapor outlet 48.

Figure 5:
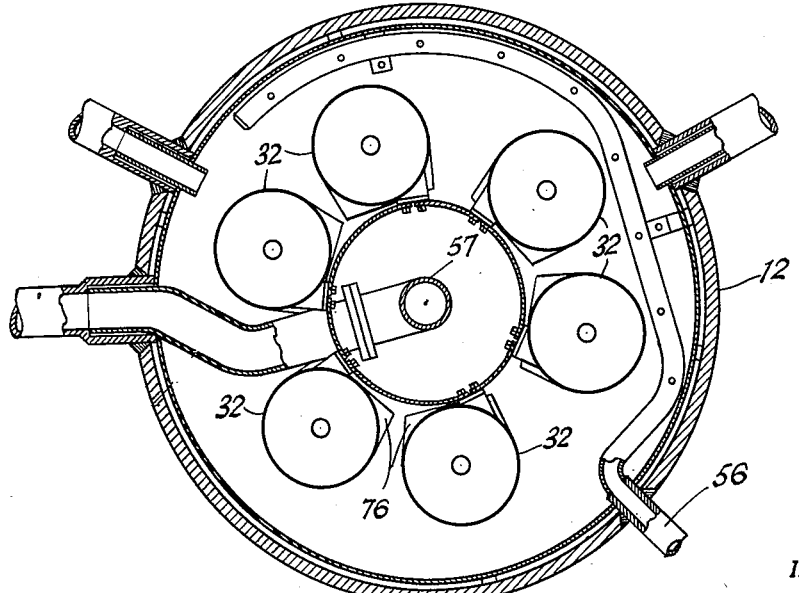
Fig. 5 is a plan section taken on the line 5—5 of Fig. 1.

The drum is arranged with a combination vent and level indicator 50 at the top of the drum, two safety valve outlets 52, an inspection manhole 54, and a blow down pipe 56 (Fig. 5).

A feed pipe and heater arrangement 57, located in the space within the circle of separators 32, functions to heat the feed liquid when the liquid level is below the outlet 58 of the feed pipe.

Figure 4:
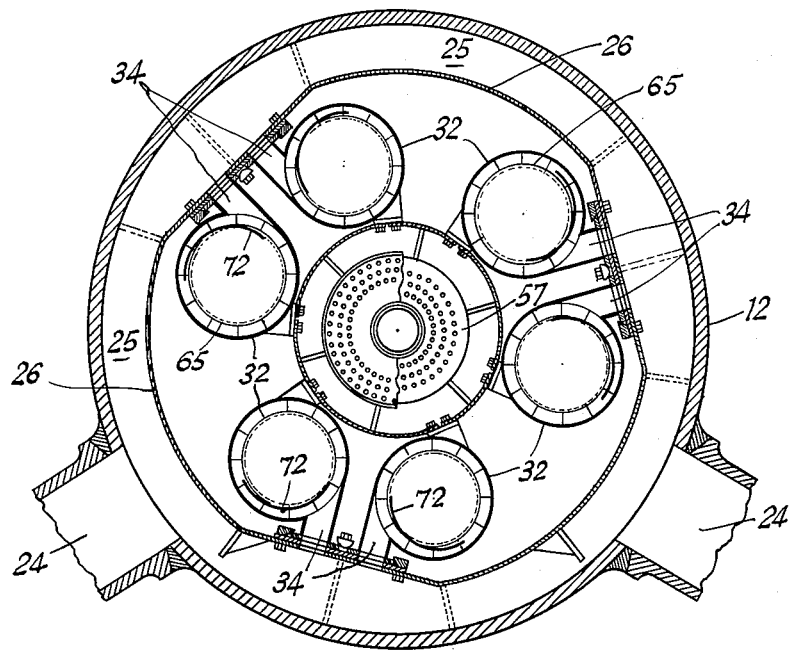
Fig. 4 is a plan section through Fig. 1 taken on the line 4—4.
Figure 6:
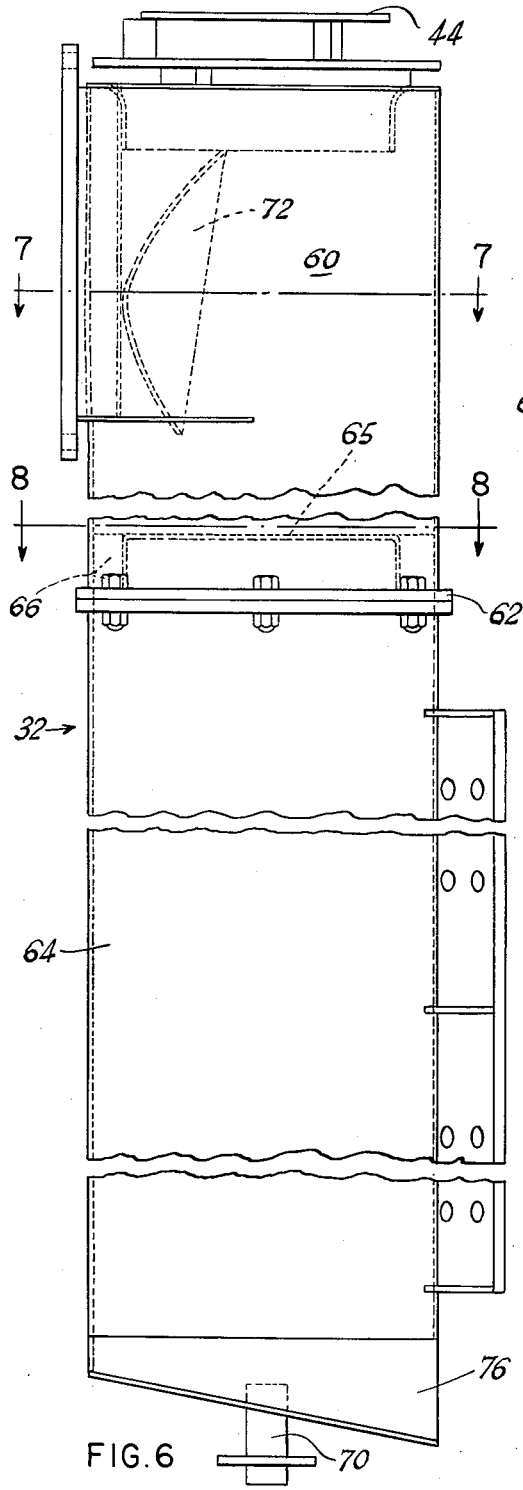
Fig. 6 is a side view of one of the individual cyclone separators.
Figure 7:
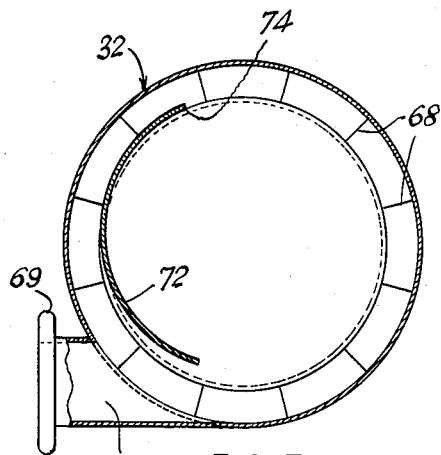
Fig. 7 is a plan section through Fig. 6 on the line 7—7.
Figure 8:
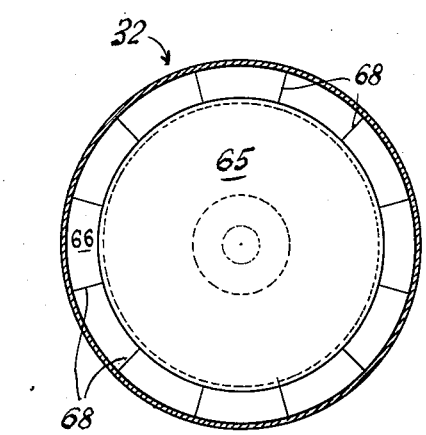
Fig. 8 is a plan section through Fig. 6 on the line 8—8.

Each separator 32 (Figs. 6, 7 and 8) is divided by a circular baffle 65 into an upper whirl chamber portion 60 above the flange 62, and a lower down flow portion 64 below the flange. The circular baffle is formed in the shape of an inverse or an upside down pan and is centrally arranged to form an annular passageway 66 (Fig. 8) leading from the upper whirl chamber to the lower downflow portion 64. Further, in the annular passage there is a plurality of impeller vanes 68 each shaped to convert the angular velocity of the whirling separated liquid into a downward velocity at is discharges into the lower downflow portion 64 of the separator. Each separator is also so arranged that its tangential inlet portion 34 is bolted at the flange 69 to the diaphragm baffle 26 of the inlet chamber 25 and the bottom portion of the separator is secured by the pin 70 seated in support plates 72 fixed to the lower head of the vessel. Mounted within each whirl chamber 60 of the separator and spaced from the whirl chamber wall is a skimmer baffle 72 (Figs. 4 and 7) which provides an elongated nozzle at the tangential entrance of the separator and the back edges 74 of these baffles act as skimmers to divide the heavy liquid from the inner portion containing a mixture of vapor and liquid so as to enhance the separating effectiveness of the separator. At the bottom of the separator the separated liquid is gathered and directed radially inward by collecting baffles or spouts 76.

The upright cylindrical cyclone separators of the invention are provided with their inlets 34 in the upper whirl chamber portion of the separator which is placed above the normal water level 18 in the drum. This allows the vapor-liquid mixture entering the vapor liquid separator to whirl at a high angular velocity while the centrifugal force separates the light vapor from the heavier liquid as the fluid traces a helically downward path due to the operation of gravity in the separator. The large centrifugal force concentrates the heavy liquid in the outer zones of each whirl chamber and, because of the end baffle 65 only liquid passes down the annular passage 66 to be converted by the impeller blades 68 to a primary downward force. This velocity conversion causes the liquid to quickly travel to the bottom portion of the drum and overcome the pressure caused by high liquid levels within the drum. However, the long lower downflow portions of the separators effect such results, that when the liquid level is very low in the drum, the separator is still effective in delivering separated liquid below the liquid level in the drum thus avoiding entrainment of the vapor in the liquid which would be a detriment to the satisfactory circulation of the vapor generator. By way of example, the cyclone separators of the present invention have a length to diameter ratio of approximately 6–1 with the whirl chamber portion 60 being less than half of the total length. Thus the liquid level may vary downward from its normal position as many as 4 to 5 diameters.

The drum of the present invention is effective with the water level programmed so that it is held highest in the drum, when the vapor generator is operating at its highest load and would be held lowest in the unit, when the unit is operating at its lowest load. Thus in each case the drum is able to accommodate a rapid change in load without inhibiting the operating efficiency of the cyclone separators.

The angular velocity converters in the annular passages divide the upper whirl chambers from the downward flow chambers of the separators because it is most important that the conversion of annular energy to downward energy be made at a time when there is a sufficiently large amount of whirling energy remaining in the liquid to be effectively converted without interfering with the centrifugal force necessary to effect the separation. Thus, in the present embodiment the impeller portion is in the upper half of the separator, but well below the inlet.

Further, the tangential inlet of each separator is at the very upper portion of the whirl chamber so as to allow the vapor-liquid mixture to revolve the maximum amount as it is pulled by gravity downward in the separator before the conversion of angular to downward velocity is accomplished.

While in accordance with the provisions of the statues, there is illustrated and described herein a specific embodiment of the invention, those skilled in the art will understand that changes may be made in the form of the invention covered by the claims, and that certain features of the invention may sometimes be used to advantage without a corresponding use of the other features.

What is claimed is:

1. In a liquid-vapor separating apparatus, a vertically elongated pressure vessel of circular horizontal cross-section adapted to contain a body of liquid having a fluctuating liquid level separating a liquid space from a vapor space, said vessel having a vapor outlet at its upper end, means defining an annular flow chamber in the upper portion of said vessel arranged to receive a liquid-vapor mixture, means for introducing a liquid-vapor mixture into said annular chamber, said annular chamber-forming means including a substantially circular vertical inner wall portion provided with a plurality of circumferentially spaced liquid-vapor outlets, a plurality of cyclonic separators disposed within the area circumscribed by said inner wall, each of said separators including a vertically elongated cylinder having an upper portion and a lower portion, means defining said upper portion from said lower portion, said upper portion forming a whirl chamber having a tangentially arranged liquid-vapor inlet and a vapor discharge opening in the upper end thereof, said vapor discharge opening of said whirl chamber communicating with the vapor outlet of said vessel, said lower portion of said cylinder forming a down-flow chamber having a liquid discharge outlet arranged below the liquid level of said body of liquid, said downflow chamber occupying a major portion of the overall height of said cylinder, and means directly connecting the tangentially arranged liquid-vapor inlet of each of said whirl chambers to a corresponding liquid-vapor outlet of said annular chamber for directing a flow of liquid-vapor mixture to said connected whirl chamber at a velocity sufficient to centrifugally separate the liquid-vapor mixture into its constituent liquid and vapor parts within the whirl chamber portion of said separator, the vapor separating from the liquid within the whirl chamber being discharged therefrom through the upper vapor opening of said whirl chamber and the separated liquid being whirled downwardly through the downflow chamber and discharging therefrom through the discharge outlet thereof into the body of liquid below the liquid level thereof.

2. In a liquid-vapor separating apparatus, a vertically elongated pressure vessel of circular horizontal cross-section adapted to contain a body of liquid having a fluctuating liquid level separating a liquid space from a vapor space, said vessel having a vapor outlet at its upper end, means defining an annular flow chamber in the upper portion of said vessel arranged to receive a liquid-vapor mixture, means for introducing a liquid-vapor mixture into said annular chamber, said annular chamber-forming means including a substantially circular vertical inner wall portion provided with a plurality of circumferentially spaced liquid-vapor outlets, a plurality of cyclonic separators disposed within the area circumscribed by said inner wall, each of said separators including a vertically elongated cylinder having an upper portion and a lower portion, said upper portion forming a whirl chamber having a tangentially arranged liquid-vapor inlet and a vapor discharge opening in the upper end thereof, said vapor discharge opening of said whirl chamber communicating with the vapor outlet of said vessel, said lower portion of said cylinder forming a downflow chamber having a liquid discharge outlet arranged below the liquid level of said body of liquid, said downflow chamber occupying a major portion of the overall height of said cylinder, and means directly connecting the tangentially arranged liquid-vapor inlet of each of said whirl chambers to a corresponding liquid-vapor outlet of said annular chamber for directing a flow of liquid-vapor mixture to said connected whirl chamber at a velocity sufficient to centrifugally separate the liquid-vapor mixture into its constituent liquid and vapor parts within the whirl chamber portion of said separator, the vapor separating from the liquid within the whirl chamber being discharged therefrom through the upper vapor opening of said whirl chamber and the separated liquid being whirled downwardly through the downflow chamber and discharging therefrom through the discharge outlet thereof into the body of liquid below the liquid level thereof.

3. In a liquid-vapor separating apparatus, a vertically elongated pressure vessel of circular horizontal cross-section adapted to contain a body of liquid having a fluctuating liquid level separating a liquid space from a vapor space, said vessel having a vapor outlet at its upper end, means defining an annular chamber in the upper portion of said vessel arranged to receive a liquid-vapor mixture, means for introducing a liquid-vapor mixture into said annular chamber, said annular chamber-forming means including a substantially circular vertical wall portion provided with a plurality of circumferentially spaced liquid-vapor outlets, a circular row of cyclonic separators disposed in concentric relationship with and exteriorly of said annular chamber, each of said separators having an upper portion forming a whirl chamber having a tangentially arranged liquid-vapor inlet, and a vapor discharge opening in the upper end thereof, said vapor discharge opening of said whirl chamber communicating with the vapor outlet of said vessel, and a lower portion forming a downflow chamber having a liquid discharge outlet arranged below the liquid level of the body of liquid, and means directly connecting the tangentially arranged liquid-vapor inlet of each of said whirl chambers to a corresponding liquid-vapor outlet of said annular chamber for directing a flow of liquid-vapor mixture to said connected whirl chamber at a velocity sufficient to centrifugally separate the liquid-vapor mixture into its constituent liquid and vapor parts within the whirl chamber portion of the separator, the vapor separating from the liquid within the whirl chamber being discharged therefrom through the upper vapor opening of said whirl chamber and the separated liquid being whirled downwardly through the downflow chamber and discharging therefrom through the discharge outlet thereof into the body of liquid below the liquid level thereof.

4. In a liquid-vapor separating apparatus, a vertically elongated pressure vessel of circular horizontal cross-section adapted to contain a body of liquid having a fluctuating liquid level separating a liquid space from a vapor space, said vessel having a vapor outlet at its upper end, means defining an annular chamber in the upper portion of said vessel, arranged to receive a liquid-vapor mixture, means for introducing a liquid-vapor mixture into said annular chamber, said annular chamber forming means including a substantially circular vertical inner wall portion provided with a plurality of circumferentially spaced liquid-vapor outlets, a circular row of cyclonic separators disposed in concentric relationship with and within the area circumscribed by said inner wall, each of said separators having an upper portion forming a whirl chamber having tangentially arranged liquid-vapor inlet and a vapor discharge opening in the upper end thereof, said vapor discharge opening of said whirl chamber communicating with the vapor outlet of said vessel, and a lower portion forming a downflow chamber having a liquid discharge outlet arranged below the liquid level of the body of liquid, and means directly connecting the tangentially arranged liquid-vapor inlet of each of said whirl chambers to a corresponding liquid-vapor outlet of said annular chamber for directing a flow of liquid-vapor mixture to said connected whirl chamber at a velocity sufficient to centrifugally separate the liquid-vapor mixture into its constituent liquid and vapor parts within the whirl chamber portion of the separator, the vapor separating from the liquid within the whirl chamber being discharged therefrom through the upper vapor opening of said whirl chamber and the separated liquid being whirled downwardly through the downflow chamber and discharging therefrom through the discharge outlet thereof into the body of liquid below the liquid level thereof.

5. A liquid-vapor separator comprising an elongated hollow cylinder having an upper portion forming a whirl chamber for separating liquid from vapor and a lower portion forming a downflow chamber receiving the separated liquid, said downflow chamber occupying the major portion of said elongated cylinder, means forming a perimetrical inlet for introducing a flow of liquid vapor mixture substantially tangential into said whirl chamber at an angular velocity to centrifugally separate the liquid-vapor mixture into its vapor and liquid constituents in said whirl chamber, said whirl chamber having an upper open end through which the separated vapor is discharged therefrom and means defining said whirl chamber from said downflow chamber, said latter means including a transversely extending baffle having a depending peripheral flange, said flange being spaced from the wall of said cylinder and forming therewith an annular passageway leading from the whirl chamber to the lower downflow chamber, and impeller vanes disposed in said passageway to positively convert the angular velocity of the separated whirling liquid in the whirl chamber into a downward velocity component as separated liquid enters the downflow chamber, said downflow chamber having a liquid outlet through which the separated liquid is discharged.

References Cited in the file of this patent

UNITED STATES PATENTS

| 2,106,589 | Bigger et al. | June 25, 1938 |
| 2,298,285 | Fletcher | Oct. 13, 1942 |
| 2,320,343 | Bailey | June 1, 1943 |
| 2,341,087 | Dunham | Feb. 8, 1944 |
| 2,434,637 | Brister | Jan. 20, 1948 |
| 2,487,633 | Breslove | Nov. 8, 1949 |
| 2,511,387 | Watson et al. | June 13, 1950 |
| 2,654,351 | Ammon | Oct. 7, 1953 |
| 2,687,780 | Culhane | Apr. 31, 1954 |
| 2,771,157 | Gustavsson | Nov. 20, 1956 |
| 2,782,772 | Blaser | Feb. 26, 1957 |

FOREIGN PATENTS

| 469,542 | Great Britain | July 27, 1937 |
| 112,778 | Australia | Mar. 21, 1941 |